United States Patent
Ghose et al.

(10) Patent No.: US 12,437,316 B1
(45) Date of Patent: Oct. 7, 2025

(54) MULTI-CHANNEL ATTRIBUTION BASED ON TIMING AND NUMBER OF EXPOSURES RELATIVE TO CONVERSION EVENTS

(71) Applicant: Alphonso Inc., Mountain View, CA (US)

(72) Inventors: Susmita Ghose, Mountain View, CA (US); Ashish Ramgopal Baldua, San Jose, CA (US)

(73) Assignee: ALPHONSO INC., Mountain View, CA (US)

( * ) Notice: Subject to any disclaimer, the term of this patent is extended or adjusted under 35 U.S.C. 154(b) by 1358 days.

(21) Appl. No.: 16/775,688

(22) Filed: Jan. 29, 2020

Related U.S. Application Data (60) Provisional application No. 62/908,944, filed on Oct. 1, 2019.

(51) Int. Cl.
*G06Q 30/00* (2023.01)
*G06Q 30/0242* (2023.01)
*G06Q 30/0272* (2023.01)

(52) U.S. Cl.
CPC ..... *G06Q 30/0243* (2013.01); *G06Q 30/0246* (2013.01); *G06Q 30/0272* (2013.01)

(58) Field of Classification Search
CPC ........... G06Q 30/0243; G06Q 30/0246; G06Q 30/0272
See application file for complete search history.

(56) References Cited

U.S. PATENT DOCUMENTS

| | | | |
|---|---|---|---|
| 9,852,439 B2 | 12/2017 | Bidyuk et al. | |
| 9,858,587 B2 | 1/2018 | Little et al. | |
| 9,891,967 B2 | 2/2018 | Curcio et al. | |
| 10,108,718 B2 | 10/2018 | Kalampoukas et al. | |
| 10,467,653 B1 * | 11/2019 | Avedissian | H04N 21/41415 |
| 2008/0248815 A1 * | 10/2008 | Busch | G06Q 30/0261 455/456.5 |
| 2011/0302025 A1 * | 12/2011 | Hsiao | G06Q 30/0283 705/14.42 |
| 2012/0054019 A1 * | 3/2012 | Kitts | G06Q 30/0246 705/14.41 |
| 2013/0124309 A1 | 5/2013 | Traasdahl et al. | |
| 2015/0370814 A1 | 12/2015 | Liodden et al. | |
| 2017/0337588 A1 * | 11/2017 | Chittilappilly | G06Q 30/0244 |
| 2017/0345050 A1 * | 11/2017 | Gregory | G06Q 30/0277 |
| 2018/0260840 A1 * | 9/2018 | Jeon | G06Q 30/0246 |
| 2020/0057975 A1 * | 2/2020 | Legrand | G06Q 10/06393 |

* cited by examiner

*Primary Examiner* — Meredith A Long
(74) *Attorney, Agent, or Firm* — Paniich Schwarze Belisario & Nadel LLP (57) ABSTRACT

An automated method and computer program product are provided for performing multi-channel attribution for conversion events associated with a plurality of consumers. Each consumer has an associated consumer identifier. Each conversion event is associated with a brand or product that has corresponding media advertising electronically delivered on a plurality of different media-based delivery channels to the plurality of consumers via a plurality of media devices associated with respective consumers. Media advertising exposure is electronically detected for each conversion event. Attribution for each of the delivery channels is then electronically determined.

6 Claims, 6 Drawing Sheets

|  | Channel A | Channel B |
|---|---|---|
| Consumer X | 0.25 | 0.75 |
| Consumer Y | 0.40 | 0.60 |
| Consumer Z | 1.00 | 0.00 |
|  |  |  |
| AVERAGE | 0.55 | 0.45 |

MULTI-CHANNEL ATTRIBUTION BASED ON TIMING AND NUMBER OF EXPOSURES RELATIVE TO CONVERSION EVENTS

CROSS-REFERENCE TO RELATED APPLICATIONS

This application claims priority to U.S. Provisional Patent Application No. 62/908,944 filed Oct. 1, 2019, which is incorporated by reference herein.

BACKGROUND OF THE INVENTION

Advertising exists in virtually all content streams, subsidizing some or all of the cost of providing the content to the consumer. Many of the ad placements are bought as part of campaigns intended to promote a brand and encourage a desired consumer action. These actions include, for example, visits to brand web site, visits to a retail outlet, or a purchase. In a social context, they may involve posting a remark online, participation in a survey, receiving a donation or a vote or a person or topic. These desired consumer interactions are generally referred to as "conversions" or "conversion events."

Ad campaigns may be realized using multiple components, involving recurring ad placements across several delivery channels. These channels can include print ads, web page ads, or via TV commercials. A given delivery channel could be narrowly defined, such as those ads shown on a specific TV network, or more broadly, such as radio ads delivered during a specific period of the day.

Through these campaigns, a consumer is exposed to multiple ads for a brand at various points in time. Advertisers are interested in tracking the impact of these different components of a campaign in an effort to optimize for those that are delivering the best results. The advertising industry has developed the concept of "attribution," which involves the measurement of multiple marketing tactics across campaign components, with the goal of assigning effectiveness weights to those components. These weights apportion credit for consumer conversions to the different components in an ad campaign.

A key input to the attribution process is exposure data, providing information on when and where a consumer was exposed to an ad. Some consumer devices are addressable; a device or consumer identifier can be associated with the device, and data can be collected on how and when a consumer has been exposed to a given ad. A consumer or device identifier may also be linked to a conversion, as part of a visit to a website or a purchase. In other cases, data from direct data on exposures may not be available. Various audience measurement and survey techniques exist to estimate the likely exposure of a consumer to various campaign components before a conversion. If direct measurement information is not available, these estimates can be used as a substitute.

The determination of attribution weights is generally a statistical process, involving exposure data from multiple sources over time. A straightforward method of attribution is to use cumulative exposure data to calculate relative frequency of exposure across a campaign. As an example, suppose a consumer was exposed to a brand 7 times on channel A and 3 times on channel B before a conversion. Based on the relative frequency of exposure, channel A and channel B would attribution weights of 0.7 and 0.3 respectively.

In addition to frequency, consumer decision making is also affected by timing and sequencing. A larger number of exposures in the past may not be more important than a smaller coordinated set of more recent exposures. In general, recall of an ad may diminish with time, but coordinated exposures over time and channels can affect ad recall and impact. Simply counting exposures without taking into account their relative timing and proximity to a conversion will not accurately reflect their influence on a conversion.

A better approach is to weight exposures by their influence on the likelihood of a conversion. The weights to be used may vary by brand, or other factors such the region or season in which the ads are presented. A single fixed method of time-weighting exposures is unlikely to be representative across a range of conditions. Given these factors, what is needed is a single adaptive method that will automatically determine the relative recency weights to be used based on empirical data. With those weights, attributions can be statistically determined that reflect that various the influence of a sequence exposures on conversion. The present invention addresses this need.

SUMMARY OF THE PRESENT INVENTION

An automated method and computer program product are provided for performing multi-channel attribution for conversion events associated with a plurality of consumers. Each consumer has an associated consumer identifier. Each conversion event is associated with a brand or product that has corresponding media advertising electronically delivered on a plurality of different media-based delivery channels to the plurality of consumers via a plurality of media devices associated with respective consumers. Media advertising exposure is electronically detected for each conversion event. Attribution for each of the delivery channels is then electronically determined.

BRIEF DESCRIPTION OF THE DRAWINGS

Preferred embodiments of the present invention will now be described by way of example with reference to the accompanying drawings.

DETAILED DESCRIPTION OF THE INVENTION

Certain terminology is used herein for convenience only and is not to be taken as a limitation on the present invention.

The words "a" and "an", as used in the claims and in the corresponding portions of the specification, mean "at least one."

I. Definitions

The following definitions are provided to promote understanding of the present invention.

media device—A media device is any device that outputs media content, such as a television, radio, smartphone, or computer. A media device thus allows for consumption of media content. Examples of media devices that output both video-based media content and audio-based media content include a smart TV, smartphone, and a smart multi-media player device.

conversion event (conversion)—In a commercial context, a conversion is an action performed by a consumer that is associated with a brand or a product, including a purchase of the brand or product, a physical visit to a retail outlet for the brand or product, or a virtual visit to a web site associated with the brand or product. (A "service" may be a brand or a product.) In a social context, a conversion is an action taken by a consumer or person, including posting a remark online, participating in a survey, receiving a donation, or voting for a candidate or a topic. A conversion event also has an associated time value. For example, if the conversion is a purchase of the brand or product, then the time value is the date/time of the purchase. If the conversion is a physical or virtual visit to a retail outlet or web site associated with the brand or product, then the time value is the date/time of the visit. While a conversion event has both a date and a time, for convenience, the date/time is referred to herein as simply a "time." Thus, each conversion event has an associated conversion time.

Conversion requires performing an action within a defined (or relevant) time period after receiving a marketing message (i.e., after being exposed to media advertising). Accordingly, if a consumer purchases a brand or product but was not exposed to any media advertising for the brand or product within the defined or relevant time period, the act of purchasing is not a conversion. Similarly, after being exposed to media advertising for a brand or product within the defined (or relevant) time period, the consumer either performs a conversion or does not perform a conversion with respect to the brand or product.

In one embodiment of the present invention, actions regarding a brand or product are detected that may or may not be a conversion event, depending upon whether the action was preceded by exposure to media advertising for the brand or product. These actions are referred to herein as "potential conversion events." If it is determined that the consumer who performed the action was previously exposed to media advertising within the defined or relevant time period for the brand or product, the action is then classified as being a conversion event. Thus, by definition, a conversion event means that the consumer who performed an action regarding a brand or product is the same consumer who was previously exposed to media advertising for the brand or product within the defined or relevant time period. If it is determined that the consumer who performed the action was not previously exposed to media advertising for the brand or product within the defined or relevant time period, the action is not classified as being a conversion event, and is ignored for purposes of this invention.

attribution—In marketing, attribution is the identification of a set of events or touchpoints that contribute in some manner to a desired outcome, such as a conversion. A value is then assigned to each of these events or touchpoints. When normalized, the value of each of the events or touchpoints adds up to "1."

media advertising exposure—Media advertising exposure refers to a discrete and measurable event wherein a consumer is exposed to a specific media advertisement/commercial ('ad') for a brand or product. The ad may be part of a larger ad campaign. Such an exposure is also known in the art as an "impression" or "ad view."

exposure time—The exposure time is the time of occurrence of the media advertising exposure. While an exposure time has both a date and a time, for convenience, the date/time is referred to herein as simply a "time."

exposure time relative to a conversion event—In one preferred embodiment, the exposure time relative to a conversion event is measured in equal time intervals between the exposure time and the conversion event. For example, if the conversion event occurs on Day x, the exposure time may be measured in days prior to x (e.g., 2 days prior to the conversion event (x−2), 30 days prior to the conversion event (x−30)). If the exposure time is measured in hours, these example values would be in the range of (x−48) and (x−720), respectively. The exact hour of the conversion and the exposure times would determine these numbers. Accordingly, the exposure time relative to a conversion event represents a "recency" parameter (i.e., how recent was the conversion event with respect to the exposure time).

histogram of exposure times (also, interchangeably referred to as a "recency histogram")—A histogram is a representation of a frequency distribution by means of rectangles whose widths represent class intervals and whose areas are proportional to the corresponding frequencies. The first step in constructing a histogram is to "bin" or "bucket" the range of values. This is performed by dividing the entire range of values into a series of intervals, and then counting how many values fall into each interval. The bins are usually consecutive, non-overlapping intervals of a variable. The bins (intervals) must be adjacent, and may be equal in size. If the bins are equal in size, a rectangle is formed over the bin with a height proportional to the frequency (i.e, the number of cases in each bin). A histogram may also be normalized to display "relative" frequencies. In this manner, the histogram shows the proportion of cases that fall into each of several categories, with the sum of the heights equaling "1."

A "histogram of exposure times" (recency histogram) is a histogram wherein the bins represent exposure time relative to a conversion event, and the height represents a count of the number of media advertising exposures that occurred at each of the different exposure times relative to a conversion event.

media-based delivery channel—A media-based delivery channel is a media source that provides ads that are viewed and/or heard by consumers on media devices or in print. Most broadly, these delivery channels are defined by the type of media (e.g., television/video, radio, print, web page), and may also be more narrowly defined by a specific media source (e.g., TV network, radio station). The delivery channel may also be defined by a media source and time period (e.g., radio ads delivered during a specific period of the day).

multi-channel attribution—Multi-channel attribution refers to a scenario wherein there are multiple, different media-based delivery channels, and an advertiser of a brand or product wants to know, quantitatively, how much each channel is contributing to a conversion associated with the brand or product. For example, if an ad campaign is being run on two different delivery channels, the advertiser wants to know what the attribution is for the first channel, and what the attribution is for the second channel. As noted above, when normalized, the attribution for the first channel and the second channel will add up to "1."

consumer identifier—A consumer identifier is a unique number assigned to a particular consumer. A device identifier (device ID) may be used as a proxy for the consumer identifier. A a device ID is equivalent to a "MAC address"

or "physical address" or other identifier which is unique for every device. A universally unique identifier (UUID) may also be used for the consumer identifier. A device graph, discussed in more detail below, may be used to associate the consumer identifier with a plurality of different media devices so as to track ad exposure across multiple media devices. The device graph may also be used to determine the consumer identifier of a consumer that performs a conversion event. Depending upon the desired granularity requirements, the consumer identifier may also identify a unique household of consumers, as opposed to a unique individual (consumer).

When referring to a conversion event, it is inherent that the consumer who performed the action for a particular brand or product and the consumer who was exposed to the media advertising for the brand or product has the same consumer identifier.

II. Detailed Description

One preferred embodiment of the present invention performs multi-channel attribution for conversion events associated with a plurality of consumers. Each consumer has an associated consumer identifier. Each conversion event is associated with a brand or product that has corresponding media advertising electronically delivered on a plurality of different media-based delivery channels to the plurality of consumers via a plurality of media devices associated with respective consumers.

Figure 1:
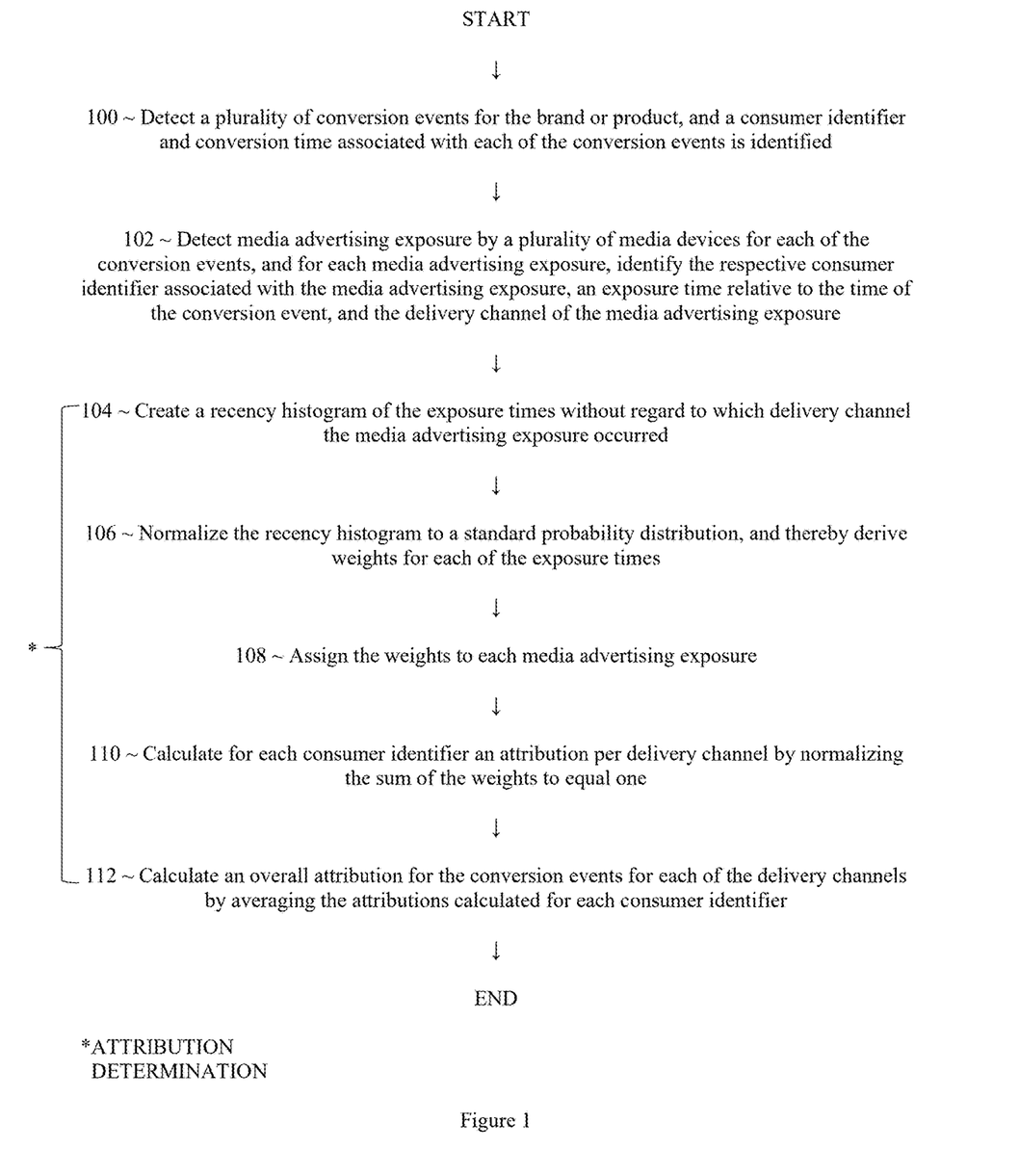
FIG. 1 is a flowchart for implementing preferred embodiments of the present invention.

Referring to FIG. 1, the multi-channel attribution is performed as follows:

1. A plurality of conversion events are detected for the brand or product, and a consumer identifier and conversion time associated with each of the conversion events is identified. (STEP 100)
2. Media advertising exposure is electronically detected by the plurality of media devices for each of the conversion events, and for each media advertising exposure, the following items are identified:
   (a) the respective consumer identifier associated with the media advertising exposure,
   (b) an exposure time relative to the time of the conversion event, and
   (c) the delivery channel of the media advertising exposure. (STEP 102)
3. Electronically determine attribution for each of the delivery channels by the following process:
   (a) Create a recency histogram of the exposure times without regard to which delivery channel the media advertising exposure occurred. (STEP 104)
   (b) Normalize the recency histogram to a standard probability distribution, and thereby derive weights for each of the exposure times. (STEP 106)
   (c) Assign the weights to each media advertising exposure. (STEP 108)
   (d) Calculate for each consumer identifier an attribution per delivery channel by normalizing the sum of the weights to equal one. (STEP 110)
   (e) Calculate an overall attribution for the conversion events for each of the delivery channels by averaging the attributions calculated for each consumer identifier. (STEP 112)

Figure 2:
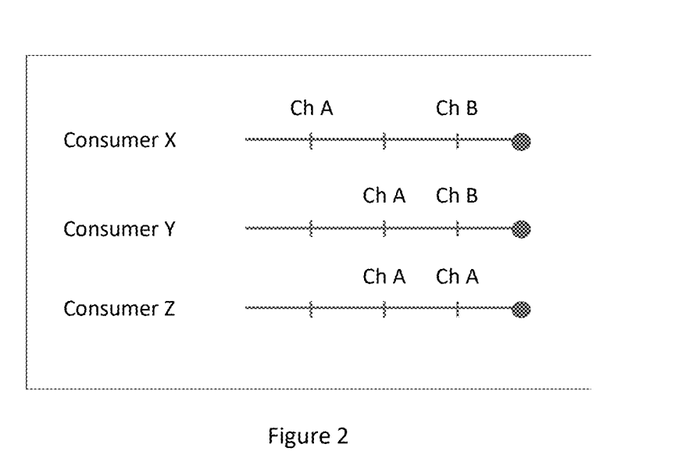
FIGS. 2-7 are diagrams for illustrating an attribution determination process in accordance with one preferred embodiment of the present invention.

An example of the attribution determination process (STEPS 104-112) is described below with respect to FIGS. 2-7. One preferred embodiment of the present invention relies upon exposure data to construct the distribution of conversions vs relative recency. This distribution is constructed by aggregating the individual exposure to conversion periods for a set of consumers. Consider the exposure data of Consumers X, Y, and Z, who are exposed to a total of six ads on Channels A and B at various times before their respective conversions. This is shown in FIG. 2 which shows three parallel timelines ending in a conversion event (conversion) represented by a circle at the end of each timeline. The vertical lines on each timeline represent day markers, backwards from the conversion. Thus, FIG. 2 illustrates exposure times relative to a conversion event of 1, 2, and 3 days.

In FIG. 2, Consumer X received one exposure on Channel A three days before a conversion, and a second exposure on Channel B one day before a conversion. Similarly, Consumer Z received two exposures on Channel A at one day before a conversion, and two days before conversion.

Figure 3:
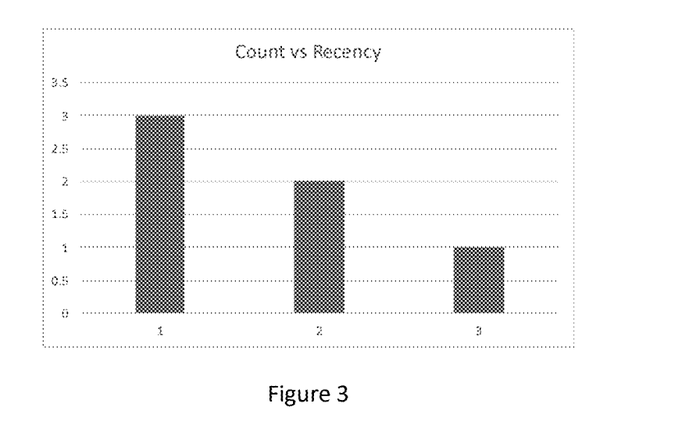

This exposure data is used to create a histogram of the recency (time from exposure to conversion), also referred to herein as a "histogram of exposure times" (recency histogram), as shown in FIG. 3, without regard to which channel an exposure occurs on.

Figure 4:
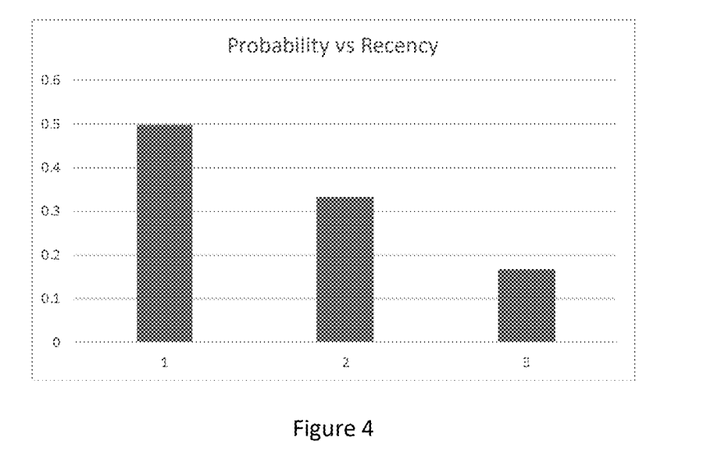

The recency histogram is normalized to a standard probability distribution, as shown in FIG. 4. This probability distribution is then used to derive the weights that are assigned to each of the original exposures by recency, as shown in FIG. 5.

Figure 5:
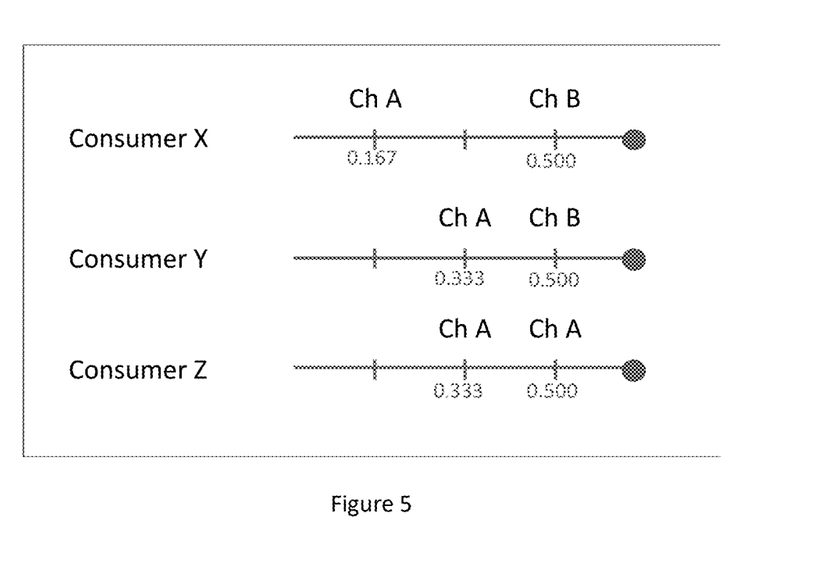
Figure 6:
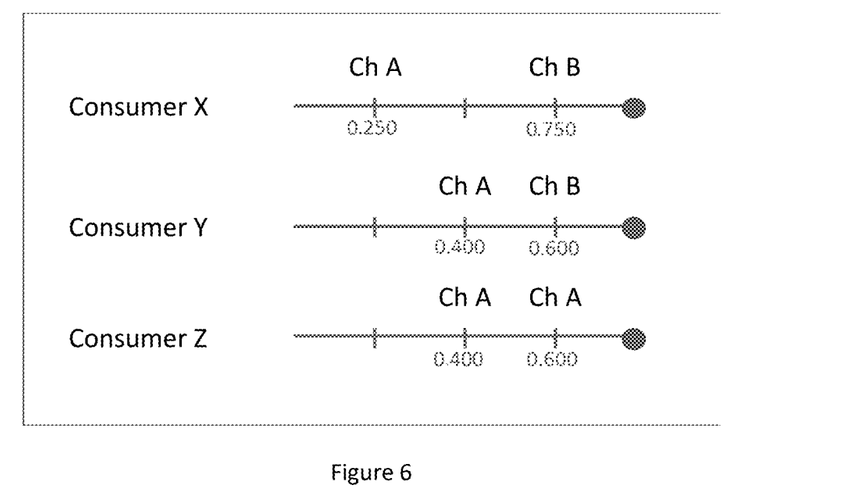

Using the data of FIG. 5, the per channel attribution is calculated for each consumer individually by normalizing the sum of the exposure weights to one, as shown in FIG. 6. For example, after normalizing the data, the conversion for Consumer X is 25% for Channel A, and 75% for channel B. This is repeated for all consumers.

Figure 7:
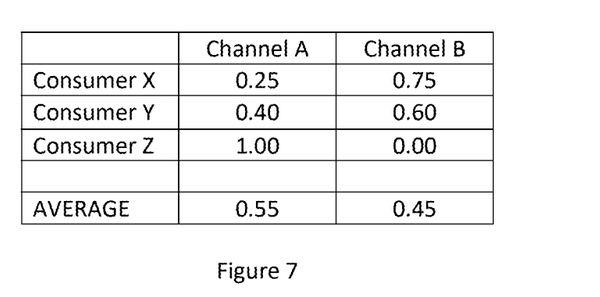

The overall attributions for Channel A and Channel B are obtained by averaging the attributions across all consumers. This is shown in FIG. 7, with an attribution of 55% for Channel A and 45% for Channel B.

This is different from the approach of calculating attribution based only on the relative number of exposures. That approach would have yielded an attribution of 67% for Channel A (4 of 6 exposures), and 33% for Channel B (2 of 6 exposures). By using conversion data to consider the timing and sequence of exposures relative to the actual conversions, preferred embodiments of the present invention provide a better estimate of the relative influence of the various channels based on real world data. Such an approach avoids making any intrinsic assumptions on the impact of the timing or sequencing of a series of exposures. It also does not dictate or assume a particular shape of the weight distribution. This avoids potential issues arising from the use of poor fitting or inappropriate models.

The recency probability distribution shown in FIG. 5 has other utility beyond the calculation of attribution. Some ads are intended to elicit a very short-term reaction, such as food or snack purchases for a weekend sports event. Others are intended to build brand awareness in anticipation of a major purchase such as a car. The recency distribution reflects the aggregate consumer response over time to the ad campaign, providing insight into whether consumers are responding over the timescale expected.

Tracking changes in the shape of the distribution over time, region, ad content or other factors also provides insight into shifts in consumer responses, such as to different advertising strategies. As an example, the effectiveness of a seasonal campaign can be compared year over year. Where two different sources of exposure data overlap, e.g. by region or consumer base, the recency distributions can be compared as well to detect unexpected variations that might reflect, for example, the accuracy or consistency of a given data source.

Figure 8:
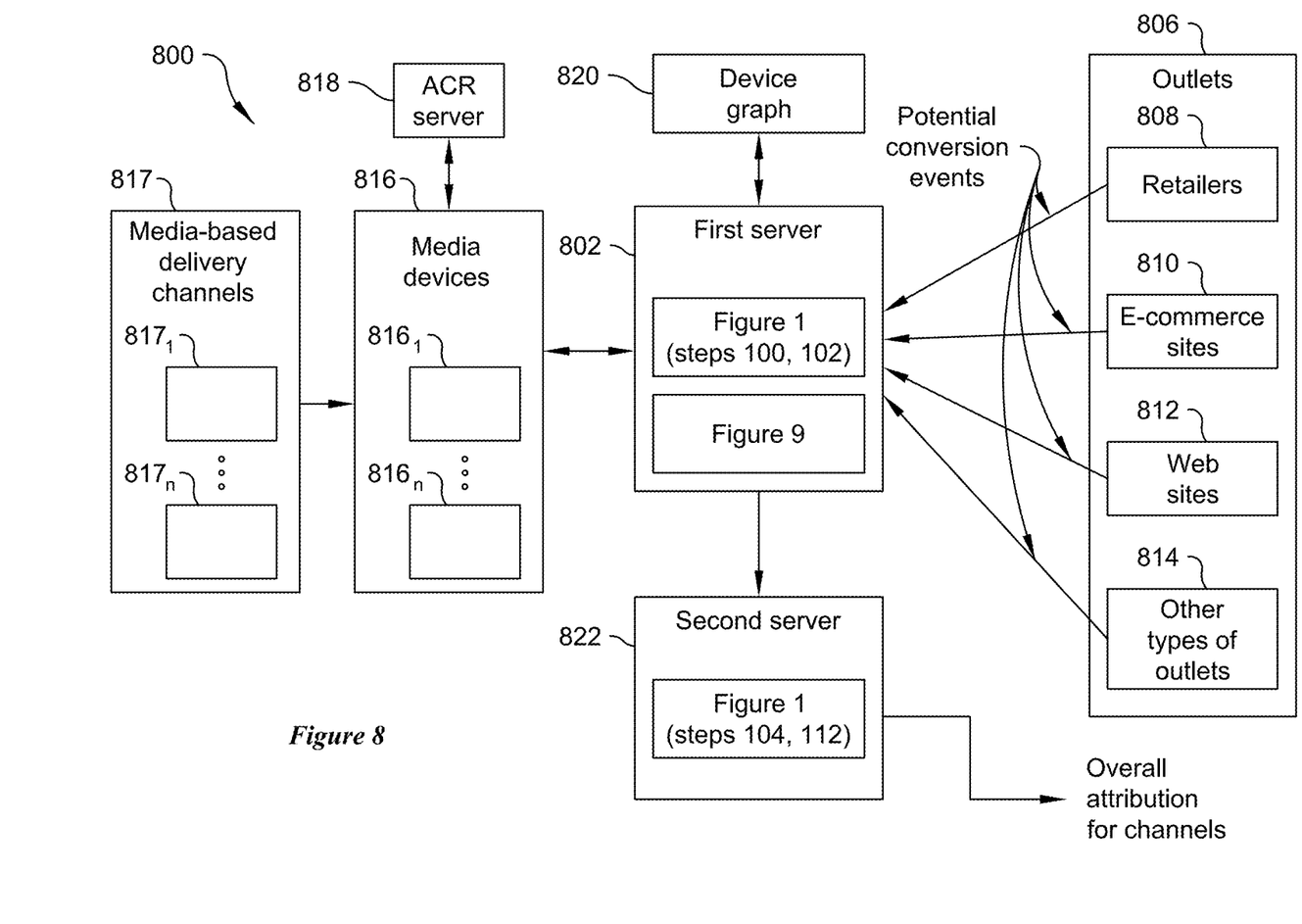
FIG. 8 is a schematic diagram of a system for implementing one preferred embodiment of the present invention.

FIG. 8 is a schematic diagram of a system 800 for implementing one preferred embodiment of the present invention. The system 800 includes a first server 802 that is configured to perform the steps 100 and 102 shown in FIG. 1. To perform these functions, the first server 802 receives potential conversion events from a plurality of outlets 806 that allow a consumer to take an action with respect to particular brands and products. These outlets 806 include retailers 808, e-commerce sites (e-tailers) 810, websites 812, and other types of outlets 814 that allow a consumer to take an action with respect to a brand or product. As discussed above, these conversion events are referred to as "potential conversion events" until it can be verified that there were one or more preceding media advertising exposures. If so, the potential conversion event is counted as an actual conversion event. If not, the potential conversion event is ignored.

The first server 802 also receives media advertising exposures (ads) for the brands or products from a plurality of media devices 816 1 -816 n (referred to collectively as "media devices 816") which receive media advertising from a plurality of media-based delivery channels 817 1 -817 n (referred to collectively as "media-based delivery channels 817"). One suitable method for receiving these exposures is to monitor the consumers' media devices 816 and perform automatic content recognition (ACR) on media content played by the media devices 816 via an ACR server 818. For example, a monitoring device (not shown), such as a consumer's mobile device which is in proximity to the consumer's media device 816 communicates with the ACR server 818. The ACR server 818, in conjunction with the monitoring device, uses digital signature/fingerprint comparisons to identify media content being played by the media device 816. Alternatively, the output of the media device 816 may be directly communicated to the ACR server 818 and a similar function is performed. More specifically, the ACR server 818 uses a search engine (not shown) and a database of known ads (not shown) to detect any ads that were played. One suitable system that performs this type of ACR is described in U.S. Pat. No. 10,108,718 (Kalampoukas), which is incorporated by reference herein.

Another suitable method to detect media advertising exposure is to monitor the consumer's media devices 816 and detect the delivery channel 817 directly from the consumer's media devices 816. Once the delivery channel 817 is detected, the media advertising that occurred on that delivery channel 817 may be looked up in a database that tracks delivered media advertising. For example, if the delivery channel 817 is a particular TV network, the ads that were run on that TV network in the particular consumer's TV market are known. Accordingly, the consumer's viewing time for the TV network, as captured by the consumer's media device 816 (e.g., smart TV) or connected device (e.g., set-top box) may be used to identify ads that ran during the consumer's viewing session.

The server 802 also receives information from the outlets 806 and the media devices 816 that allows the server 802 to identify a consumer identifier associated with the respectively received potential conversion events and media advertising exposures. In one scenario, this information is provided directly from the respective media device 816 and outlets 806. In another scenario where this information is not available to be provided directly, the first server 802 may use a device graph 820 to attempt to identify the consumer identifier from any consumer-related identifying information provided by the respective media devices 816 and outlets 806.

Data analytics companies maintain "device graphs" which can bridge between device ID's and IP addresses (both of which may be captured during consumer sessions with e-commerce sites 810 and web sites 812), subscriber data, credit card numbers, email addresses, physical names and addresses, phone number, and other personal identifying data, so as to identify a unique consumer identifier. Device graphs are described in U.S. Patent Application Publication Nos. 2015/0370814 (Liodden et al.), and 2013/0124309 (Traasdahl), both of which are assigned to TAPAD, Inc., and both of which are incorporated by reference herein. The device graph 820 may be similar to the device graphs described in these patent references, or may be built with any other well-known type of device graph. While device graphs are commonly used to associate users with electronic devices on which they consume media, the device graph 820 may include additional consumer information to allow conversion events by consumers at physical retailers 808 to also be matched up to a consumer identifier. Device graphs are well-known in the art and thus are not further described herein.

The system 800 must operate in view of the condition that a conversion event, if it occurs at all, inherently occurs after media advertising exposure. In one preferred embodiment, the first server 802 addresses this condition by continuously receiving media advertising exposures from the media devices 816, and also continuously receiving potential conversion events from the outlets 806. When the first server 802 detects a potential conversion event for a brand or product from one of the outlets 806, and the first server 802 also detects one or more media advertising exposures that occurred prior to the potential conversion event for the same brand or product, and, both are associated with the same consumer identifier, this set of data is flagged for attribution analysis.

Figure 9:
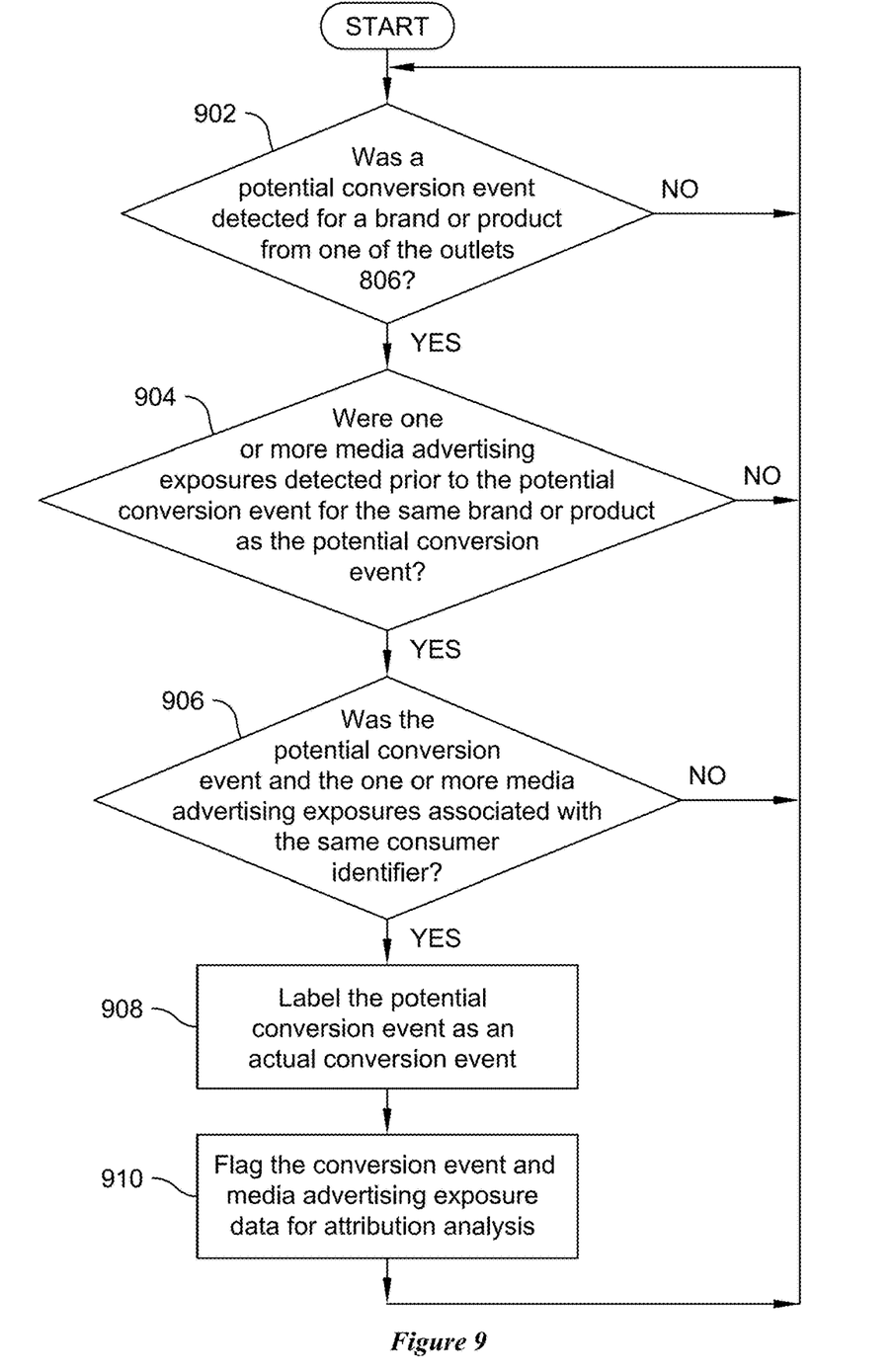
FIG. 9 is a flowchart for processing potential conversion event data and media advertising exposure data in accordance with one preferred embodiment of the present invention.

As stated above, the first server 802 continuously receives media advertising exposures from the media devices 816, and continuously receives potential conversion events from the outlets 806. Referring to the flowchart of FIG. 9, the first server 802 performs the following tests on this continuously received data:

STEP 902: Was a potential conversion event detected for a brand or product from one of the outlets 806?

STEP 904: Were one or more media advertising exposures detected prior to the potential conversion event for the same brand or product as the potential conversion event?

STEP 906: Was the potential conversion event and the one or more media advertising exposures associated with the same consumer identifier?

For any of the decision steps 902, 904, and 906, if the answer NO, the flow reverts back to STEP 902. If the answer for a decision step is YES, the flow continues to the subsequent step. If all three tests in steps 902, 904, and 906 are passed, the following steps are performed:

STEP 908: Label the potential conversion event as an actual conversion event.

STEP 910: Flag the conversion event and media advertising exposure data for attribution analysis.

Since this is a continuous process, there is no END step in the flowchart. However, if this process is performed on a batched set of data, the process ends when there are no more detected potential conversion events to analyze. The order of the steps can be rearranged, if desired, as long as the data is tested for all of the relevant conditions.

The data sets represented in FIGS. 2-7 are all data sets that passed the tests shown in FIG. 9, and thus represent actual conversion events that can be used for attribution analysis. Once the data sets that represent actual conversion events are assembled, second server 822 determines attribution for each of the delivery channels 817 by performing the steps 104-112 of FIG. 1. The second server 822 may be separate from, or part of, the first server 802.

III. Additional Considerations

A. Weighting Impressions

In the example above, the weights assigned for each of the exposure times are assigned by giving equal weight to each media advertising exposure (impression). However, in an alternative embodiment, the weights assigned for each of the exposure times are unequal for at least some of the media advertising exposures that are known to be more or less effective based on historical data. For example, it may be known from the historical data that Monday night ads are more (or less) effective for certain products. Alternatively, other contextual factors (e.g., time of day, program content relevance to ad subject matter) may have a known effect on influence of the impression that would call for unequal weighting.

In another alternative embodiment, the attribution weights may change when calculated at different time scales, or over different time windows. Such calculations would provide insight into how an ad campaign performed over time. For example, calculating attribution weights using hours as the unit of recency might lead to different results than using days (different time scales), possibly capturing those times of the day that are more influential than others. Similarly, determining attribution over a two month window might give a certain set of results. If the results are recalculated for the first and second months separately, one might see that while channels A and B had roughly equal weights over the two month window, A had a higher score than B in the first month, while the reverse was true in the second month when computed as two one-month intervals.

The present invention may be implemented with any combination of hardware and software. If implemented as a computer-implemented apparatus, the present invention is implemented using means for performing all of the steps and functions described above.

When implemented in software, the software code for the program instructions in processors (computers) of the first and second servers 802 and 822 which perform the steps shown in FIGS. 1 and 9 can be executed on any suitable processor or collection of processors, whether provided in a single computer or distributed among multiple computers.

The present invention can also be included in an article of manufacture (e.g., one or more non-transitory, tangible computer program products) having, for instance, computer readable storage media. The storage media has computer readable program code (program instructions) stored therein that is encoded with instructions for execution by a processor (processors in the servers 802 and 822) for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above. The storage media may also be implemented via network storage architecture, wherein many devices, which are paired together, are available to a network.

The processor(s)/computer(s) used herein for the servers 802 and 822 may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The processor(s)/computer(s) used in the servers 802 and 822 are not a general-purpose computers, but instead are specialized computer machine that perform a myriad of functions shown in FIGS. 1 and 9 that are not native to a general-purpose computer, absent the addition of specialized programming.

The servers 802 and 822, the media-based delivery channels 817, the media devices 816, the ACR server 818, the device graph 820, and the outlets 806 may be interconnected to their respective elements by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An automated method for performing multi-channel attribution for conversion events associated with a plurality of consumers, each consumer having an associated consumer identifier, wherein each conversion event is associated with a brand or product that has corresponding media advertising electronically delivered on a plurality of different media-based delivery channels to the plurality of consumers via a plurality of media devices associated with respective consumers, the method comprising:
   (a) detecting a plurality of conversion events for the brand or product, and identifying a consumer identifier and conversion time associated with each of the conversion events, wherein the consumer identifier associated with each of the conversion events is identified using one or more device graphs;
   (b) electronically detecting media advertising exposure by the plurality of media devices for each of the conversion events by:
      (i) monitoring the consumers' media devices using electronic monitoring devices, and
      (ii) performing automatic content recognition (ACR) on media content played by the media devices using an ACR server, wherein the ACR server uses one or more of digital signature and digital fingerprint comparisons to identify the media content played by the media devices,
   and for each media advertising exposure, identifying:
      (i) the respective consumer identifier associated with the media advertising exposure,
      (ii) an exposure time relative to the time of the conversion event, and
      (iii) the delivery channel of the media advertising exposure; and
   (c) electronically determining attribution for each of the delivery channels by:
      (i) creating a recency histogram of the exposure times without regard to which delivery channel the media advertising exposure occurred, wherein the recency histogram includes bins and a height for each bin, the bins representing different exposure times relative to the time of the conversion event, and the height representing a count of the number of media advertising exposures that occurred at each of the different exposure times relative to the time of the conversion events, and wherein the exposure times are for the plurality of consumers, and wherein all media advertising exposures are counted when creating the recency histogram, regardless of whether any specific ad exposure leads to a conversion,
      (ii) normalizing the recency histogram to a standard probability distribution, and thereby deriving weights for each of the exposure times,
      (iii) assigning the weights to each media advertising exposure,
      (iv) calculating for each consumer identifier an attribution per delivery channel by normalizing the sum of the weights to equal one, and
      (v) calculating an overall attribution for the conversion events associated with the plurality of consumers for each of the delivery channels by averaging the attributions calculated for each consumer identifier.

2. The method of claim 1 wherein the weights assigned for each of the exposure times are assigned by giving equal weight to each media advertising exposure.

3. The method of claim 1 wherein the weights assigned for each of the exposure times are assigned by giving unequal weight to at least some of the media advertising exposures that are known to be more or less effective based on historical data.

4. A computer program product for performing multi-channel attribution for conversion events associated with a plurality of consumers, each consumer having an associated consumer identifier, wherein each conversion event is associated with a brand or product that has corresponding media advertising electronically delivered on a plurality of different media-based delivery channels to the plurality of consumers via a plurality of media devices associated with respective consumers, the computer program product comprising a computer readable medium tangibly embodying non-transitory computer-executable program instructions thereon that, when executed, cause one or more computing devices to:
   (a) electronically detect a plurality of conversion events for the plurality of consumers, and identify the respective consumer identifier associated with each of the conversion events, wherein the consumer identifier associated with each of the conversion events is identified using one or more device graphs;
   (b) electronically detect media advertising exposure for each conversion event by:
      (i) monitoring the consumers' media devices using electronic monitoring devices, and
      (ii) performing automatic content recognition (ACR) on media content played by the media devices using an ACR server, wherein the ACR server uses one or more of digital signature and digital fingerprint comparisons to identify the media content played by the media devices,
   and for each media advertising exposure, identify:
      (i) the respective consumer identifier associated with the media advertising exposure,
      (ii) an exposure time relative to the conversion event, and
      (iii) the delivery channel of the media advertising exposure; and
   (c) electronically determine attribution for each of the delivery channels by:
      (i) creating a recency histogram of the exposure times without regard to which delivery channel the media advertising exposure occurred, wherein the recency histogram includes bins and a height for each bin, the bins representing different exposure times relative to the time of the conversion event, and the height representing a count of the number of media advertising exposures that occurred at each of the different exposure times relative to the time of the conversion events, and wherein the exposure times are for the plurality of consumers, and wherein all media advertising exposures are counted when creating the recency histogram, regardless of whether any specific ad exposure leads to a conversion, (ii) normalizing the recency histogram to a standard probability distribution, and thereby deriving weights for each of the exposure times, (iii) assigning the weights to each media advertising exposure, (iv) calculating for each consumer identifier an attribution per delivery channel by normalizing the sum of the weights to equal one, and (v) calculating an overall attribution for the conversion events associated with the plurality of consumers for each of the delivery channels by averaging the attributions calculated for each consumer identifier.

5. The computer program product of claim 4 wherein the weights assigned for each of the exposure times are assigned by giving equal weight to each media advertising exposure.

6. The computer program product of claim 4 wherein the weights assigned for each of the exposure times are assigned by giving unequal weight to at least some of the media advertising exposures that are known to be more or less effective based on historical data.

* * * * *